United States Patent
Ito et al.

(10) Patent No.: US 12,001,811 B2
(45) Date of Patent: Jun. 4, 2024

(54) PRODUCT-SUM OPERATION DEVICE, LOGICAL CALCULATION DEVICE, NEUROMORPHIC DEVICE, AND MULTIPLY-ACCUMULATE METHOD

(71) Applicant: TDK CORPORATION, Tokyo (JP)

(72) Inventors: Kuniyasu Ito, Tokyo (JP); Tatsuo Shibata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 686 days.

(21) Appl. No.: 17/281,021

(22) PCT Filed: Oct. 11, 2018

(86) PCT No.: PCT/JP2018/037962
§ 371 (c)(1),
(2) Date: Mar. 29, 2021

(87) PCT Pub. No.: WO2020/075272
PCT Pub. Date: Apr. 16, 2020

(65) Prior Publication Data
US 2021/0349693 A1    Nov. 11, 2021

(51) Int. Cl.
G06F 7/544    (2006.01)
G06G 7/16    (2006.01)
G06N 3/065    (2023.01)

(52) U.S. Cl.
CPC ............ *G06F 7/5443* (2013.01); *G06G 7/16* (2013.01); *G06N 3/065* (2023.01)

(58) Field of Classification Search
CPC .............. G06F 7/5443; G06F 17/16; G06G 17/16–164; G06G 17/186; G06N 3/065
See application file for complete search history.

(56) References Cited

U.S. PATENT DOCUMENTS

2016/0336064 A1*  11/2016  Seo ................... G11C 13/0002
2018/0350432 A1   12/2018  Sasaki
2019/0237137 A1*   8/2019  Buchanan .......... G11C 13/0007

FOREIGN PATENT DOCUMENTS

JP           5160304 B2    3/2013
WO      2017/183573 A1   10/2017

OTHER PUBLICATIONS

Dec. 18, 2018 International Search Report issued in International Patent Application No. PCT/JP2018/037962.
(Continued)

*Primary Examiner* — Andrew Caldwell
*Assistant Examiner* — Carlo Waje
(74) *Attorney, Agent, or Firm* — Oliff PLC

(57) ABSTRACT

A multiply-accumulate calculation device includes: multiple calculation units which generates output signals by multiplying an input signal corresponding to an input value and having a rising part, a signal part, and a falling part by a weight, and output the output signals; an accumulate calculation unit configured to calculate a sum of the output signals output from the plurality of multiple calculation units; and a correction unit configured to execute correction processing for correcting the sum of the output signals on the basis of a correction value including at least one of a first value incorporated into the sum by a current flowing into variable resistors of the multiple calculation units due to the rising part of the input signal, and a second value incorporated into the sum by a current flowing into the variable resistors of the multiple calculation units due to the falling part of the input signal.

14 Claims, 7 Drawing Sheets

(56) References Cited

OTHER PUBLICATIONS

Burr et al.; "Neuromorphic computing using non-volatile memory;" Advances in Physics: X; vol. 2; No. 1; pp. 89-124; 2017.

\* cited by examiner

PRODUCT-SUM OPERATION DEVICE, LOGICAL CALCULATION DEVICE, NEUROMORPHIC DEVICE, AND MULTIPLY-ACCUMULATE METHOD

TECHNICAL FIELD

The present disclosure relates to a multiply-accumulate calculation device, a logical calculation device, a neuromorphic device, and a multiply-accumulate calculation method.

BACKGROUND ART

To improve power consumption that is one of the drawbacks of conventional neural networks, research using a memristor that is a passive element which records charge that has passed therethrough and changes resistance according to recording of charge is being actively conducted.

In conventional neural networks, weights are added to input data and a total value thereof is input to an activation function to obtain an output. Accordingly, attempts to realize multiply-accumulate calculation using an analog circuit by combining two or more variable resistance elements having continuously varying resistances and reading the sum of current values output therefrom are being made.

In a learning process of a neural network, a memristor allocated to each synapse has a resistance value that changes to become a predetermined weight and holds this value even when power is cut off. In an interference process, pulse width modulation (PWM) for changing a voltage pulse length in response to a level of input data using values of memristors in which information is held is used.

For example, Non Patent Literature 1 discloses a method of executing an operation of a neural network using resistance change elements such as memristors. Here, in the operation of the neural network, the sum of output signals output from a plurality of resistance change elements to which an input signal corresponding to voltage pulses is input is calculated. It is desirable to execute calculation of the sum of these output signals as accurately as possible.

CITATION LIST

Non Patent Literature

Non Patent Literature 1

Geoffrey W. Burr, Robert M. Shelby, Abu Sebastian, Sangbum Kim, Seyoung Kim, Severin Sidler, Kumar Virwani, Masatoshi Ishii, Pritish Narayanan, Alessandro Fumarola, Lucas L. Sanches, Irem Boybat, Manuel Le Gallo, Kibong Moon, Jiyoo Woo, Hyunsang Hwang & Yusuf Leblebici, Advances in Physics: X, 2, 89 (2017)

SUMMARY OF INVENTION

Technical Problem

A resistance change element has a circuit configuration in which a parasitic capacitor and a parasitic resistor are connected in parallel as an equivalent circuit, and a rush current caused by charging/discharging to/from the parasitic capacitor of each resistance change element is generated according to input of an input signal corresponding to voltage pulses. Accordingly, as a means for alleviating heating of a circuit or a load of the circuit due to this rush current, a rate of voltage change at a rising part and a falling part of the input signal is reduced.

However, when the rate of voltage change at a rising part and a falling part is reduced, a current also flows into the parasitic resistor of each resistance change element and thus a value caused by this current is incorporated into the aforementioned sum of the output signals, causing deterioration of the accuracy of calculation of the sum.

Accordingly, an object of the present disclosure is to provide a multiply-accumulate calculation device, a logical calculation device, a neuromorphic device, and a multiply-accumulate calculation method capable of executing accurate multiply-accumulate calculation.

Solution to Problem

One aspect of the present disclosure is a multiply-accumulate calculation device including: a plurality of multiple calculation units configured to generate output signals by multiplying an input signal corresponding to an input value and having a rising part, a signal part, and a falling part by a weight, and output the output signals; an accumulate calculation unit configured to calculate a sum of the output signals output from the plurality of multiple calculation units; and a correction unit configured to execute correction processing for correcting the sum of the output signals on the basis of a correction value including at least one of a first value incorporated into the sum by a current flowing into variable resistors of the plurality of multiple calculation units due to the rising part of the input signal, and a second value incorporated into the sum by a current flowing into the variable resistors of the plurality of multiple calculation units due to the falling part of the input signal.

Furthermore, in one aspect of the present disclosure, each of the plurality of multiple calculation units includes a magnetoresistance effect element exhibiting a magnetoresistance effect.

Furthermore, in one aspect of the present disclosure, each of the plurality of multiple calculation units includes a resistance change element having a write terminal, a common terminal, and a read terminal.

Furthermore, one aspect of the present disclosure is the multiply-accumulate calculation device further including an input unit configured to input an input signal for correction having the rising part and the falling part to the multiple calculation units, wherein the multiple calculation units is further configured to generate output signals for correction by multiplying the input signal for correction by a weight, and output the output signals for correction, the accumulate calculation unit is further configured to calculate a sum of the output signals for correction output from the plurality of multiple calculation units, and the correction unit is configured to execute the correction processing using the sum of the output signals for correction as the correction value.

Furthermore, one aspect of the present disclosure is the multiply-accumulate calculation device further including a correction value storage unit configured to stores the correction value.

Furthermore, one aspect of the present disclosure is the multiply-accumulate calculation device wherein the input signal is input to the multiple calculation units through resistors.

One aspect of the present disclosure is a logical calculation device including any one of the above-described multiply-accumulate calculation devices.

One aspect of the present disclosure is a neuromorphic device including any one of the above-described multiply-accumulate calculation devices.

Furthermore, one aspect of the present disclosure is a multiply-accumulate calculation method including: a multiple calculation process of generating output signals by multiplying an input signal corresponding to an input value and having a rising part, a signal part, and a falling part by a weight, and outputting the output signals; an accumulate calculation process of calculating a sum of the output signals output through the multiple calculation process; and a correction process of executing correction processing for correcting the sum of the output signals on the basis of a correction value including at least one of a first value incorporated into the sum by a current flowing into variable resistors of the plurality of multiple calculation units due to the rising part of the input signal, and a second value incorporated into the sum by a current flowing into the variable resistors of the plurality of multiple calculation units due to the falling part of the input signal.

Advantageous Effects of Invention

According to the above-described multiply-accumulate calculation device, logical calculation device, neuromorphic device, and multiply-accumulate calculation method, it is possible to provide a multiply-accumulate calculation device, a logical calculation device, a neuromorphic device, and a multiply-accumulate calculation method capable of executing accurate multiply-accumulate calculation.

DESCRIPTION OF EMBODIMENTS

First Embodiment

An example of a configuration of a multiply-accumulate calculation device according to a first embodiment will be described with reference to FIG. 1 and FIG. 2.

Figure 1:
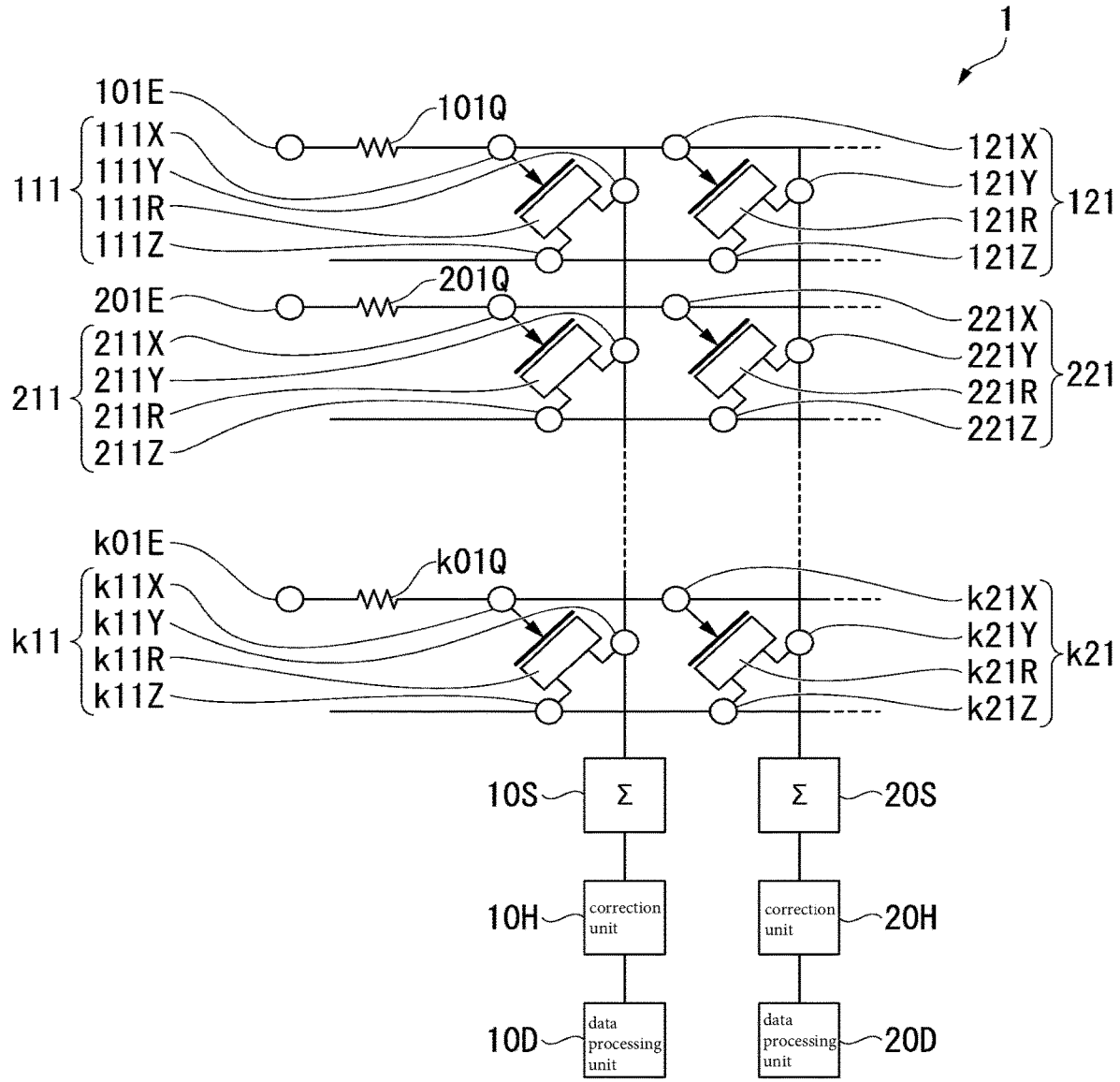
FIG. 1 is a diagram illustrating an example of a configuration of a part of a multiply-accumulate calculation device according to a first embodiment.

FIG. 1 is a diagram illustrating an example of a configuration of a part of the multiply-accumulate calculation device according to the first embodiment. As illustrated in FIG. 1, the multiply-accumulate calculation device 1 includes multiple calculation units 111, 121, 211, 221, ..., k11, and k21, input units 101E, 201E, ..., k01E, resistors 101Q, 201Q, ..., k01Q, accumulate calculation units 10S and 20S, correction units 10H and 20H, and data processing units 10D and 20D.

Figure 2:
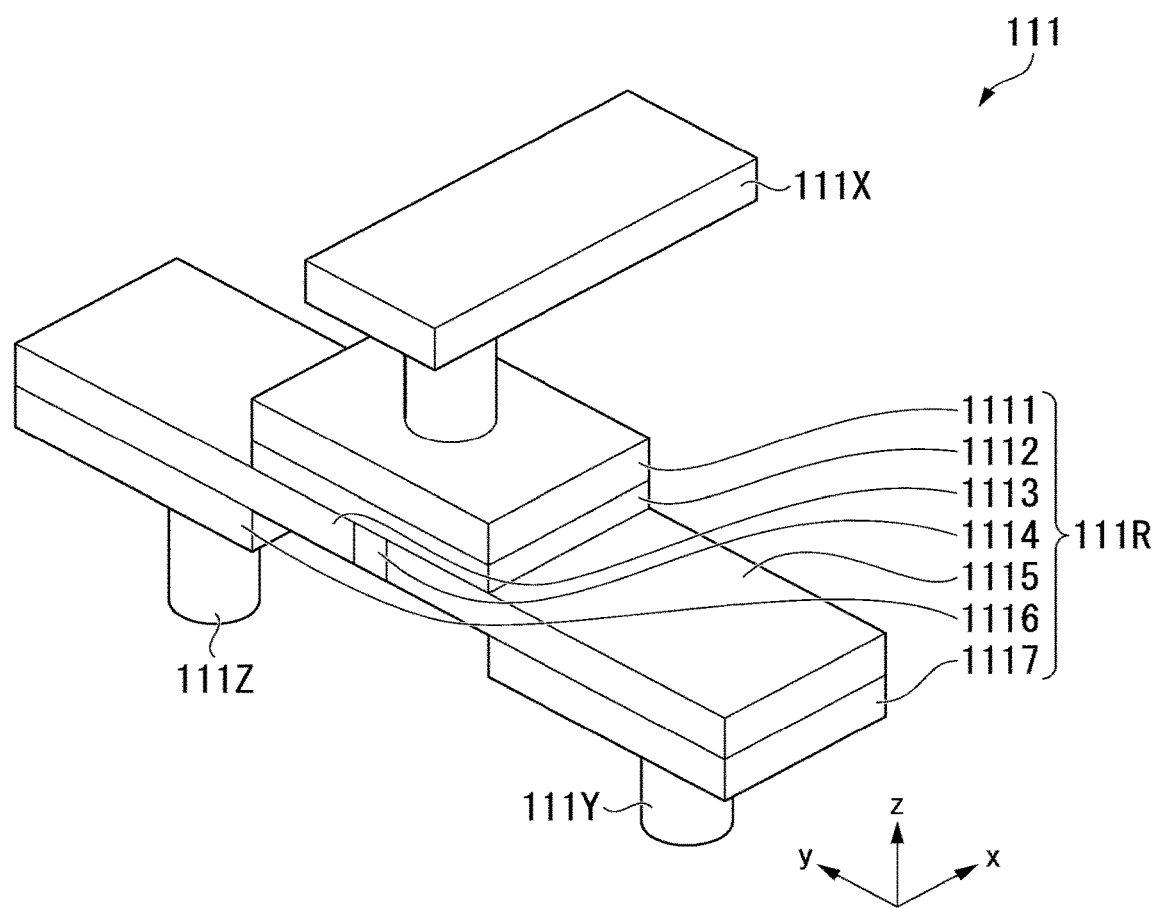
FIG. 2 is a diagram illustrating an example of a resistance change element according to the first embodiment.

FIG. 2 is a diagram illustrating an example of a resistance change element according to the first embodiment. The multiple calculation unit 111 is a resistance change element, that is, a magnetoresistance effect element illustrated in FIG. 2. As illustrated in FIG. 1 and FIG. 2, the multiple calculation unit 111 includes a variable resistor 111R, a read terminal 111X, a common terminal 111Y, and a write terminal 111Z. In addition, the multiple calculation units 121, 211, 221, ..., k11, and k21 illustrated in FIG. 1 are resistance change elements, for example, the same magnetoresistance effect elements as that illustrated in FIG. 2 and respectively include variable resistors 121R, 211R, 221R, ..., k11R, and k21R, read terminals 121X, 211X, 221X, ..., k11X, and k21X, common terminals 121Y, 211Y, 221Y, ..., k11Y, and k21Y, and write terminals 121Z, 211Z, 221Z, ..., k11Z, and k21Z. Although the multiple calculation unit 111 will be appropriately exemplified in the following description, the same applies to other multiple calculation units 121, 211, 221, ..., k11, and k21.

Here, the variable resistor 111R included in the multiple calculation unit 111 may include, for example, a magnetization fixed layer 1111, a nonmagnetic layer 1112, a first region 1113, a magnetic domain wall 1114, a second region 1115, a first magnetization supply layer 1116, and a second magnetization supply layer 1117, as illustrated in FIG. 2. Hereinafter, the x axis, the y axis, and the z axis illustrated in FIG. 2 will be used in description using FIG. 2. The x axis, the y axis, and the z axis form three-dimensional rectangular coordinates of a right-handed system. The magnetization fixed layer 1111, the nonmagnetic layer 1112, the first region 1113, the second region 1115, the first magnetization supply layer 1116, and the second magnetization supply layer 1117 are formed in thin rectangular parallelepiped shapes laminated in the z-axis direction, and a surface having a maximum area is parallel to the xy plane and is electrically and magnetically connected to the first region 1113 and the second region 1115. Although the magnetization fixed layer 1111, the nonmagnetic layer 1112, the first region 1113, the second region 1115, the first magnetization supply layer 1116, and the second magnetization supply layer 1117 are laminated in this order, the lamination direction may be reversed. In this case, positions of the read terminal 111X, the common terminal 111Y, and the write terminal 111Z are also reversed.

The magnetization fixed layer 1111 has a magnetization direction fixed in the z direction. Here, fixing of magnetization means that a magnetization direction does not change at the time of initialization for introducing the magnetic domain wall 1114 and before and after writing using a write current. In addition, the magnetization fixed layer 1111 may be, for example, an in-plane magnetization film having in-plane magnetic anisotropy or a perpendicular magnetization film having perpendicular magnetic anisotropy.

One surface of the nonmagnetic layer 1112 is in contact with the surface of the magnetization fixed layer 111 in the z direction on the opposite side to the surface in contact with the read terminal 111X. The other surface thereof in the z direction is in contact with the first region 1113 and the second region 1115. Although the surfaces of the magnetization fixed layer 1111 in the z direction and the surfaces of the nonmagnetic layer 1112 in the z direction may not have the same shape and area, the nonmagnetic layer 1112 may extend to cover the first region 1113 and the second region 1115 and be larger than the magnetization fixed layer 1111 on the xy plane. In addition, the nonmagnetic layer 1112 is used for the multiple calculation unit 111 to read change in a magnetization state of a magnetization free layer with respect to the magnetization fixed layer 111 as change in a resistance value.

The first region 1113, the magnetic domain wall 1114, and the second region 1115 form a magnetization free layer. The magnetization free layer is formed of a ferromagnetic material and magnetization directions of the first region 1113 and the second region 1115 are opposite to each other in the z direction. The magnetic domain wall 1114 faces in a direction intermediate between that of the first region 1113 and the second region 1115. For example, in a case where the magnetization direction of the first region 1113 is fixed to the +z direction, the magnetic domain wall 1114 is in contact with the surface opposite the contact surface of the magnetization fixed layer 1111 and the nonmagnetic layer 1112 in the z direction. On the other hand, in a case where the magnetization direction of the second region 1115 is fixed to the −z direction, the magnetic domain wall 1114 is in contact with the surface opposite the contact surface of the magnetization fixed layer 1111 and the nonmagnetic layer 1112 in the z direction. The magnetic domain wall 1114 is sandwiched between the first region 1113 and the second region 1115 in the y direction.

It is desirable that the first magnetization supply layer 1116 do not overlap the magnetization fixed layer 1111 in the z direction, and the surface thereof facing the +z direction is in contact with the surface of the first region 1113 facing the −z direction. The first magnetization supply layer 1116 has a function of fixing a magnetization direction of a range of the first region 1113 which overlaps the first magnetization supply layer 1116 in the z direction to a desired direction. Further, the write terminal 111Z is connected to the surface of the first magnetization supply layer 1116 facing the −z direction. Meanwhile, the first magnetization supply layer 1116 may be formed in a synthetic antiferromagnetic structure composed of ferromagnetic substance/nonmagnetic substance/ferromagnetic substance including the same ferromagnetic material as that available for the magnetization fixed layer 1111, an antiferromagnetic substance such as IrMn, and a nonmagnetic interlayer such as Ru, Ir, or the like, for example.

It is desirable that the second magnetization supply layer 1117 do not overlap the magnetization fixed layer 1111 in the z direction, and the surface thereof facing the +z direction is in contact with the surface of the second region 1115 facing the −z direction. In addition, the second magnetization supply layer 1117 has a function of fixing a magnetization direction of a range of the second region 1115 which overlaps the second magnetization supply layer 1117 in the z direction to a desired direction. Further, the common terminal 111Y is connected to the surface of the second magnetization supply layer 1117 facing the −z direction. Meanwhile, the second magnetization supply layer 1117 may be formed in a synthetic antiferromagnetic structure composed of ferromagnetic substance/nonmagnetic substance/ferromagnetic substance including the same ferromagnetic material as that available for the magnetization fixed layer 1111, an antiferromagnetic substance such as IrMn, and a nonmagnetic interlayer such as Ru, Ir, or the like, for example.

The magnetization direction of the magnetization fixed layer 1111 and the magnetization directions of the first region 1113, the second region 1115, the first magnetization supply layer 1116, and the second magnetization supply layer 1117 in the variable resistor 111R may be the x direction or the y direction as well as the z direction. In such a case, it is desirable that the magnetization fixed layer 1111, the first region 1113, the second region 1115, the first magnetization supply layer 1116, and the second magnetization supply layer 1117 have the same magnetization direction. For example, in a case where the magnetization direction of the magnetization fixed layer 1111 is the +y direction, the magnetization direction of the first region may be the +y direction, the magnetization direction of the second region may be the −y direction, the magnetization direction of the first magnetization supply layer 1116 may be the +y direction, and the magnetization direction of the second magnetization supply layer 1117 may be the −y direction.

The multiple calculation unit 111 changes the position of the magnetic domain wall 1114 in the y direction by adjusting the magnitude and duration of a write current flowing between the common terminal 111Y and the write terminal 111Z. Accordingly, the multiple calculation unit 111 can continuously change a ratio of the area of a region having a parallel magnetization direction to the area of a region having an antiparallel magnetization direction and change the resistance value of the variable resistor 111R approximately linearly. Here, the region having a parallel magnetization direction is the area of a part of the first region 1113 that overlaps the magnetization fixed layer 1111 in the z direction. In addition, the region having an antiparallel magnetization direction is the area of a part of the second region 1115 that overlaps the magnetization fixed layer 1111 in the z direction. Further, the write current is input to the write terminal 111Z. The magnitude and duration of the write current are adjusted by at least one of the number of current pulses and a current pulse width.

Meanwhile, the multiple calculation unit 111 may be a tunneling magnetoresistance effect element. The tunneling magnetoresistance effect element includes a magnetization fixed layer, a magnetization free layer, and a tunnel barrier layer as a nonmagnetic layer. The magnetization fixed layer and the magnetization free layer are formed of a ferromagnetic material and have magnetization. The tunnel barrier layer is sandwiched between the magnetization fixed layer and the magnetization free layer. The tunneling magnetoresistance effect element can change a resistance value by changing a relation between the magnetization of the magnetization fixed layer and the magnetization of the magnetization free layer.

Referring back to FIG. 1, the input unit 101E is connected to the read terminals 111X and 121X through the resistor 101Q. Likewise, the input unit 201E is connected to the read terminals 211X and 221X illustrated in FIG. 1 through the resistor 201Q, and the input unit k01E is connected to the read terminals k11X and k21X through the resistor k01Q.

The input unit 101E inputs an input signal corresponding to an input value to the read terminals 111X and 121X through the resistor 101Q. Likewise, the input unit 201E inputs the input signal corresponding to the input value to the read terminals 211X and 221X through the resistor 201Q. In addition, likewise, the input unit k01E inputs the input signal corresponding to the input value to the read terminals k11X and k21X through the resistor k01Q.

All of these input signals are voltage signals on which pulse width modulation (PWM) has been performed in response to the input values and have a signal part, a rising part, and a falling part. The signal part is a part of an input signal which will be used for multiply-accumulate calculation, and it is desirable that the signal part be a constant voltage but it may not necessarily be a constant voltage. The rising part refers to a part of the input signal which rises from zero voltage to the voltage level of the signal part. The falling part refers to a part of the input signal which falls from the voltage level of the signal part to zero voltage.

Meanwhile, the read terminals 111X and 121X may be directly connected to the input unit 101E without the resistor 101Q. Likewise, the read terminals 211X and 221X illustrated in FIG. 1 may be directly connected to the input unit 201E without the resistor 201Q. In addition, the read terminals k11X and k21X may be directly connected to the input unit k01E without the resistor k01Q.

In this case, the input unit 101E inputs an input signal in which voltage change rates at a rising part and a falling part have been decreased to the read terminals 111X and 121X without using the resistor 101Q. Likewise, the input unit 201E inputs an input signal in which voltage change rates at a rising part and a falling part have been decreased to the read terminals 211X and 221X without using the resistor 201Q. In addition, likewise, the input unit k01E inputs an input signal in which voltage change rates at a rising part and a falling part have been decreased to the read terminals k11X and k21X without using the resistor k01Q.

The multiple calculation unit 111 multiplies an input signal corresponding an input value by a weight to generate an output signal and outputs the output signal. That is, the multiple calculation unit 111 reads the resistance value of the variable resistor 111R as a weight, executes multiple calculation on an input signal input to the read terminal 111X to generate an output signal, and outputs the output signal through the common terminal 111Y. Likewise, the multiple calculation units 121, 211, 221, . . . , k11, and k21 multiply the input signal corresponding to the input value by a weight to generate output signals and output the output signals, respectively.

The accumulate calculation unit 10S calculates the sum of output signals output from the multiple calculation units 111, 211, . . . , k11 and outputs the calculation result to the correction unit 10H. Likewise, the accumulate calculation unit 20S calculates the sum of output signals output from the multiple calculation units 121, 221, . . . , k21 and outputs the calculation result to the correction unit 20H. The accumulate calculation units 10S and 20S will be described in detail later.

The correction unit 10H executes correction processing for correcting the sum of the output signals on the basis of a correction value including at least one of a first value and a second value and outputs an analog signal generated from correction processing to the data processing unit 10D. Here, the first value is a value incorporated into the sum by a current flowing into at least one of the variable resistors 111R, 211R, . . . , k11R of the multiple calculation units 111, 211, . . . , k11 due to a rising part of the input signal. In addition, the second value is a value incorporated into the sum by a current flowing into at least one of the variable resistors 111R, 211R, . . . , k11R of the multiple calculation units 111, 211, . . . , k11 due to a falling part of the input signal. The same applies to the correction unit 20H. Meanwhile, the correction unit 10H may execute correction processing by multiplying at least one of the first value and the second value by a weight. In addition, the correction units 10H and 20H will be described in detail later.

The data processing unit 10D converts the analog signal output from the correction unit 10H into a digital signal and performs activation function processing on the digital signal to convert the digital signal into an analog signal again. Likewise, the data processing unit 20D converts the analog signal output from the correction unit 20H into a digital signal and performs activation function processing on the digital signal to convert the digital signal into an analog signal again. The data processing units 10D and 20D will be described in detail later.

Next, an example of a method of calculating a sum using the multiply-accumulate calculation device according to the first embodiment will be described with reference to FIG. 3 to FIG. 6.

Figure 3:
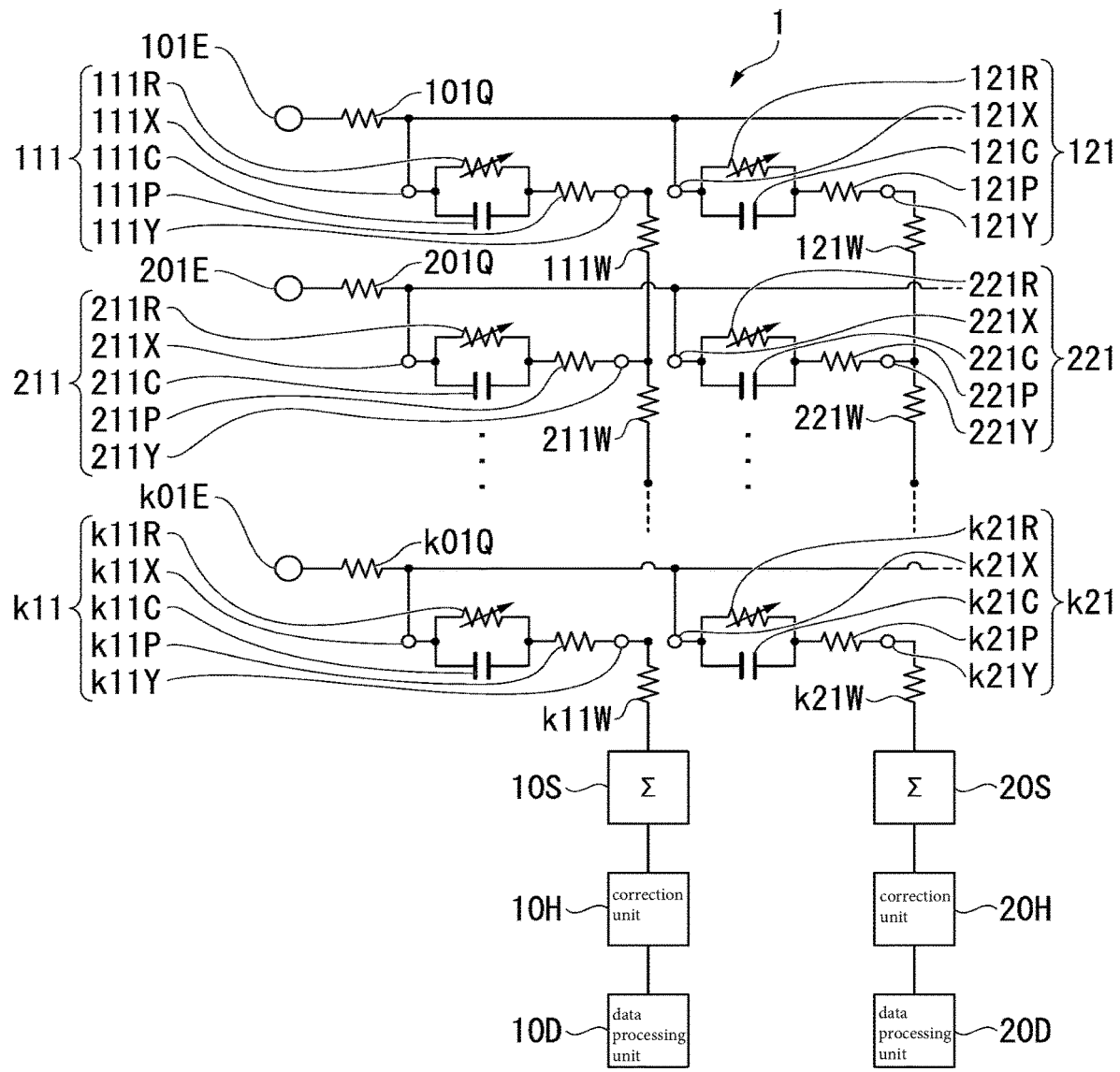
FIG. 3 is a diagram illustrating an example of an equivalent circuit of the configuration of a part of the multiply-accumulate calculation device according to the first embodiment.

FIG. 3 is a diagram illustrating an example of an equivalent circuit of a configuration of a part of the multiply-accumulate calculation device according to the first embodiment. As illustrated in FIG. 3, it can be conceived that the multiple calculation unit 111 includes a parasitic capacitor 111C and a parasitic resistor 111P as an equivalent circuit of a variable resistor, the parasitic capacitor 111C is connected in parallel to the variable resistor 111R, and the parasitic resistor 111P is serially connected to the variable resistor 111R. Likewise, the multiple calculation units 121, 211, 221, . . . , k11, and k21 respectively include parasitic capacitors 121C, 211C, 221C, . . . , k11C, and k21C and parasitic resistors 121P, 211P, 221P, . . . , k11P, and k21P. Further, it can be conceived that wiring resistors 111W, 121W, 211W, 221W, . . . , k11W, and k21W are serially connected to the multiple calculation units 111, 121, 211, 221, . . . , k11, and k21, respectively.

Figure 4:
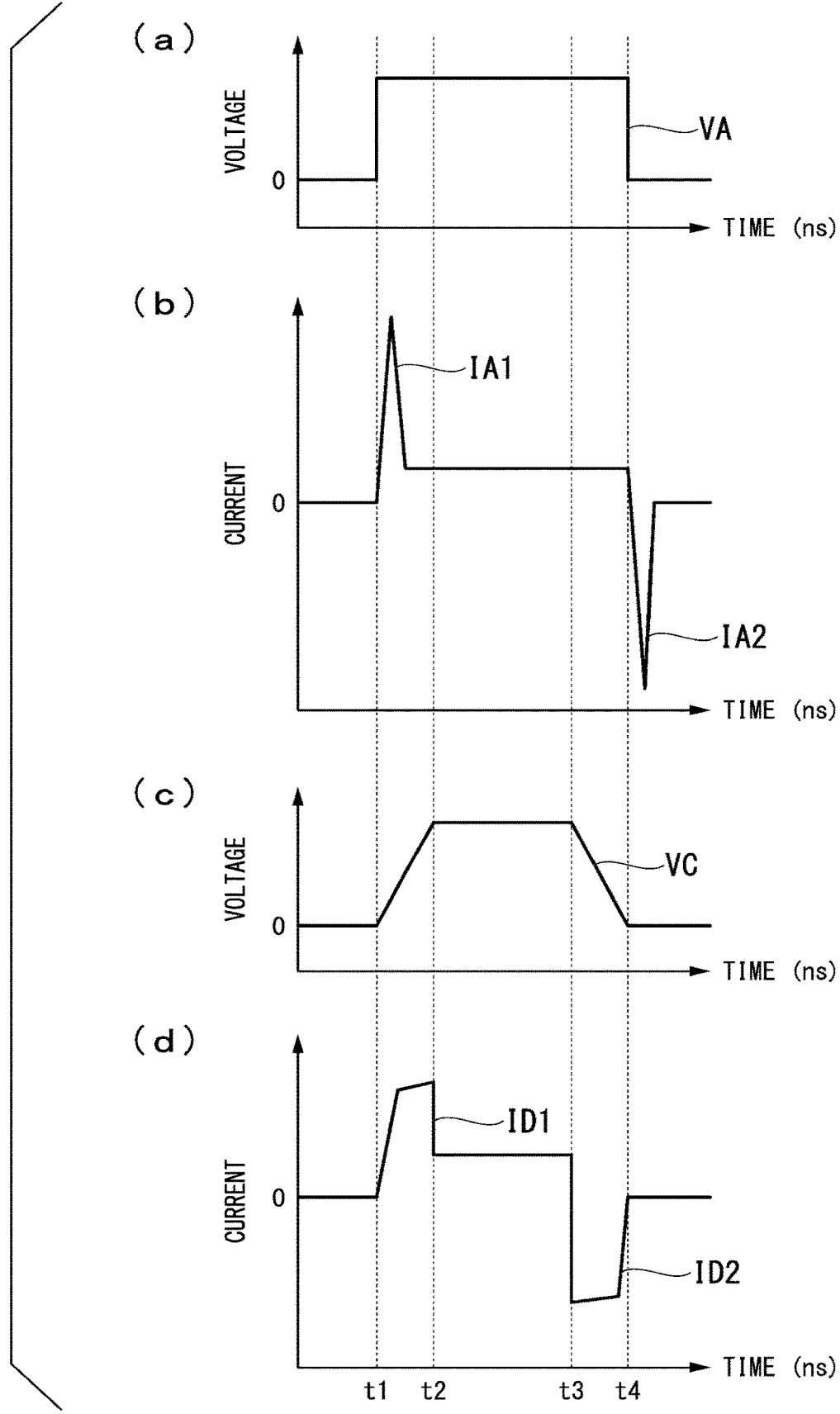
FIG. 4 is a diagram illustrating an example of rush currents when an input signal has passed through a multiple calculation unit 111 according to the first embodiment.

FIG. 4 is a diagram illustrating an example of an input signal according to the first embodiment and rush currents when the input signal has passed through the multiple calculation unit 111. The input unit 101E outputs a pulse-width-modulated input signal, for example, an input signal VA illustrated in FIG. 4($a$). The input signal VA has a signal part, a rising part, and a falling part. The rising part of the input signal VA is a part approximately vertically rising from zero voltage to the voltage level of the signal part at a time t1. The signal part is a period immediately after the time t1 until a time immediately after time t4, and the length of the period corresponds to an input value. The falling part is a part approximately vertically falling from zero voltage to the voltage level of the signal part at the time t4.

If the input signal VA illustrated in FIG. 4($a$) is directly input to the read terminal 111X of the multiple calculation unit 111 without passing through the resistor 101Q, rush currents IA1 and IA2 illustrated in FIG. 4($b$) are generated. The rush current IA1 is caused by the rising part of the input signal VA and generated due to charging to the parasitic capacitor 111C of the multiple calculation unit 111. The rush current IA2 is caused by the falling part of the input signal VA and generated due to discharging from the parasitic capacitor 111C of the multiple calculation unit 111.

As illustrated in FIG. 4($a$), since the durations of the rising part and the falling part are short, the rush currents IA1 and IA2 illustrated in FIG. 4($b$) extinct within a short time. In addition, most of the rush currents IA1 and IA2 flow into the parasitic capacitor 111C of the multiple calculation unit 111 and only the rest flows into the variable resistor 111R of the multiple calculation unit 111. Accordingly, in a case where the input signal VA has been directly input to the read terminal 111X of the multiple calculation unit 111 without passing through the resistor 101Q, the rush currents IA1 and IA2 cause a slight variation in the sum of output signals calculated by the accumulate calculation unit 10S.

However, generation of the rush currents IA1 and IA2 may lead to heating of the multiply-accumulate calculation device 1, occurrence of an erroneous operation due to heating, and increase in a load of the multiply-accumulate calculation device 1. In addition, when the rush currents IA1 and IA2 increase, it may be necessary to increase the capacitance of a capacitor in which charges caused by output signals are accumulated. Accordingly, an input signal VC illustrated in FIG. 4(c), for example, may be input to the multiple calculation unit 111 in order to curb generation of the rush currents IA1 and IA2.

The input signal VC illustrated in FIG. 4(c) is generated, for example, when the input signal VA illustrated in FIG. 4(a) has passed through the resistor 101Q. That is, the durations of the rising part and the falling part of the input signal VA increase and the duration of the signal part of the input signal VA decreases according to the resistor 101Q. The input signal VC has a signal part, a rising part, and a falling part. The rising part of the input signal VC is a period from the time t1 to a time t2 and a part rising from zero voltage to the voltage level of the signal part. The signal part is a period from the time t2 to a time t3 and the length of the period corresponds to an input value. The falling part is a period from the time t3 to the time t4 and a part falling from the voltage level of the signal part to zero voltage.

When the input signal VC illustrated in FIG. 4(c) has been input to the read terminal 111X of the multiple calculation unit 111, rush currents ID1 and ID2 illustrated in FIG. 4(d) are generated. The rush current ID1 is caused by the rising part of the input signal VC and generated due to charging to the parasitic capacitor 111C of the multiple calculation unit 111. The rush current ID2 is caused by the falling part of the input signal VA and generated due to discharging from the parasitic capacitor 111C of the multiple calculation unit 111.

As illustrated in FIG. 4(c), since the durations of the rising part and the falling part of the input signal VC are longer than those of the rising part and the falling part of the input signal VA illustrated in FIG. 4(a), the rush currents ID1 and ID2 illustrated in FIG. 4(d) are less than the rush currents IA1 and IA2 illustrated in FIG. 4(b). Accordingly, it is possible to curb heating of the multiply-accumulate calculation device 1, occurrence of an erroneous operation due to heating, and increase in a load of the multiply-accumulate calculation device 1, decrease rush currents, and reduce the capacitance of a capacitor in which charges caused by output signals are accumulated by inputting the input signal VC to the multiple calculation unit 111.

However, since the durations of generation of the rush currents ID1 and ID2 are longer than those of the rush currents IA1 and IA2, as illustrated in FIG. 4(a) and FIG. 4(c), a proportion thereof flowing into the variable resistor 111R of the multiple calculation unit 111 becomes greater than that of the rush currents IA1 and IA2. Accordingly, when the input signal VC illustrated in FIG. 4(c) has been input to the read terminal 111X of the multiple calculation unit 111, the sum of output signals calculated by the accumulate calculation unit 10S may vary due to the rush currents ID1 and ID2.

In addition, description with reference to FIG. 4 is equally applied to the multiple calculation units 121, 211, 212, . . . , k11, and k21, and the accumulate calculation unit 20S.

Accordingly, the multiply-accumulate calculation device 1 corrects the sum of output signals which has varied due to the rising part and the falling part of the input signal VC through a method which will be described below.

Figure 5:
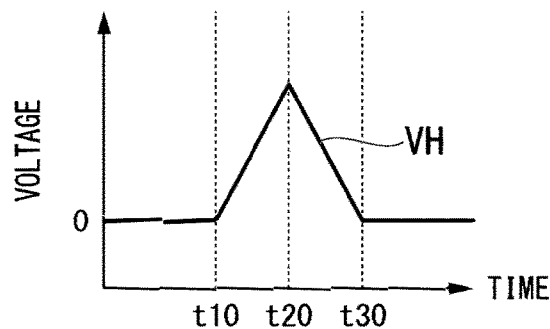
FIG. 5 is a diagram illustrating an example of an input signal for correction according to the first embodiment.

FIG. 5 is a diagram illustrating an example of an input signal for correction according to the first embodiment. The input unit 101E inputs the input signal VH for correction illustrated in FIG. 5 to the read terminals 111X and 121X by inputting a predetermined signal to the resistor 101Q. Likewise, the input unit 201E inputs the input signal VH for correction illustrated in FIG. 5 to the read terminals 211X and 221X by inputting a predetermined signal to the resistor 201Q. In addition, likewise, the input unit k01E inputs the input signal VH for correction illustrated in FIG. 5 to the read terminals k11X and k21X by inputting a predetermined signal to the resistor k01Q.

The input signal VH for correction has a rising part and a falling part. Specifically, the input signal VH for correction includes a rising part rising from zero voltage to the voltage level of the signal part of the input signal VC illustrated in FIG. 4(c) in a period from a time t10 to a time t20, as illustrated in FIG. 5. The inclination and duration of the rising part of the input signal VH for correction are identical to the inclination and duration of the rising part of the input signal VC illustrated in FIG. 4(c). In addition, the input signal VH for correction includes a falling part falling from the voltage level of the signal part of the input signal VC illustrated in FIG. 4(c) to zero voltage in a period from the time t20 to a time t30. The inclination and duration of the falling part of the input signal VH for correction are identical to the inclination and duration of the falling part of the input signal VC illustrated in FIG. 4(c).

Meanwhile, it is desirable that the area of the rising part of the input signal VH for correction be closer to the area of the rising part of the input signal VC illustrated in FIG. 4(c) because the area of the rising part of the input signal VH for correction corresponds to the first value included in the correction value used by the correction unit 10H for the aforementioned correction processing. Likewise, it is desirable that the area of the falling part of the input signal VH for correction be closer to the area of the falling part of the input signal VC illustrated in FIG. 4(c) because the area of the falling part of the input signal VH for correction corresponds to the second value included in the correction value used by the correction unit 10H for the aforementioned correction processing.

The multiple calculation unit 111 multiplies the input signal VH for correction by a weight to generate an output signal for correction and outputs the output signal for correction. That is, the multiple calculation unit 111 reads the resistance value of the variable resistor 111R as a weight, executes multiple calculation on the input signal VH for correction input to the read terminal 111X to generate an output signal for correction, and outputs the output signal for correction through the common terminal 111y. Likewise, the multiple calculation units 121, 211, 221, . . . , k11, and k21 multiply the input signal VH for correction by weights to generate output signals for correction and output the output signals, respectively.

The accumulate calculation unit 10S calculates the sum of the output signals for correction output from the multiple calculation units 111, 211, . . . , k11 and outputs the calculation result to the correction unit 10H. The correction unit 10H sets the sum acquired through the calculation to a correction value and executes correction processing of subtracting the correction value from the sum of the output signals output from the multiple calculation units 111, 211, . . . , k11. Likewise, the accumulate calculation unit 20S calculates the sum of the output signals for correction output from the multiple calculation units 121, 221, . . . , k21 and outputs the calculation result to the correction unit 20H. The correction unit 20H sets the sum acquired through the calculation to a correction value and executes correction processing of subtracting the correction value from the sum of the output signals output from the multiple calculation units 121, 221, . . . , k21.

In addition, the correction values obtained by inputting the input signal VH for correction illustrated in FIG. 5 to the multiple calculation units 111, 121, 211, 221, . . . , k11, and k21 may be stored in a correction value storage unit. The correction value storage unit is a storage medium storing correction values.

Figure 6:
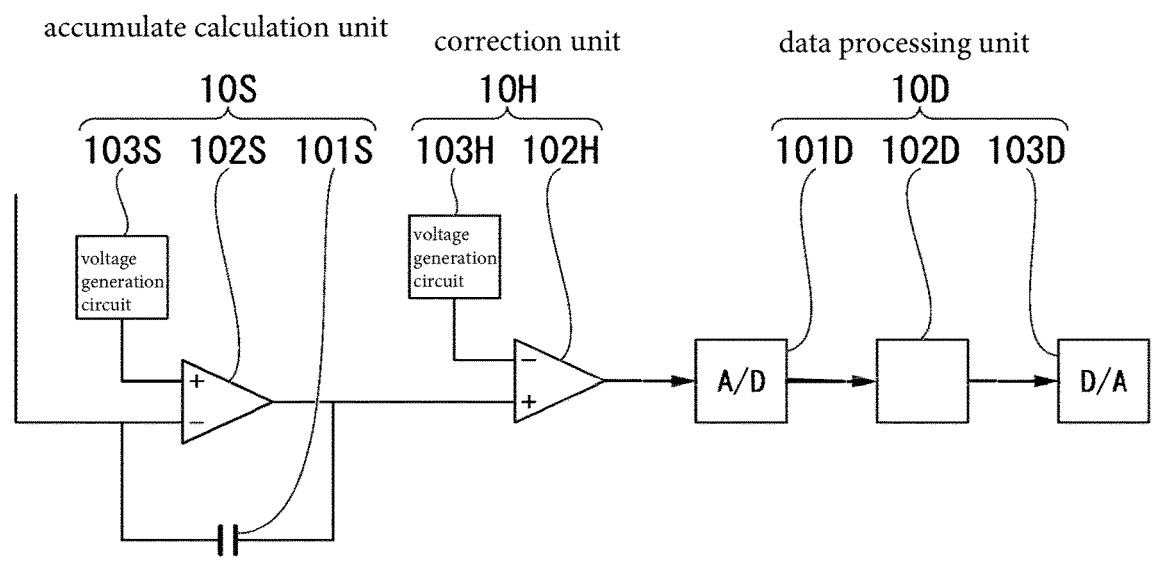
FIG. 6 is a diagram for describing an example of an accumulate calculation unit, a correction unit, and a data processing unit according to the first embodiment.

Next, a specific example of the accumulate calculation unit, the correction unit, and the data processing unit included in the multiply-accumulate calculation device 1 will be described with reference to FIG. 6. FIG. 6 is a diagram for describing an example of the accumulate calculation unit, the correction unit, and the data processing unit according to the first embodiment. Although the accumulate calculation unit 10S, the correction unit 10H, and the data processing unit 10D will be exemplified in the following description, the same applies to the accumulate calculation unit 20S, the correction unit 20H, and the data processing unit 20D.

As illustrated in FIG. 6, the accumulate calculation unit 10S includes a capacitor 101S, a comparator 102S, and a reference voltage generation circuit 103S. One terminal of the capacitor 101S is connected to the common terminals 111Y, 211Y, . . . , k11Y of the multiple calculation units 111, 211, . . . , k11 and an inverted input terminal of the comparator 102S and the other terminal thereof is connected to an output terminal of the comparator 102S. Charges caused by output signals output from the multiple calculation units 111, 211, . . . , k11 are accumulated in the capacitor 101S. The comparator 102S reads the voltage of the capacitor 103 using a reference voltage supplied from the reference voltage generation circuit 103S connected to a non-inverted input terminal thereof and outputs the read voltage to the correction unit 10H. Here, the read voltage is the sum of the output signals output from the multiple calculation units 111, 211, . . . , k11.

As illustrated in FIG. 6, the correction unit 10H includes a comparator 102H and a correction voltage generation circuit 103H. A non-inverted input terminal of the comparator 102H is connected to the output terminal of the comparator 102S, an inverted input terminal thereof is connected to the correction voltage generation circuit 103H, and an output terminal thereof is connected to the data processing unit 10D. The comparator 102H corrects the sum of the output signals, which has been corrected by the correction unit 10H, using a correction voltage supplied from the correction voltage generation circuit 103H. That is, the correction voltage is determined on the basis of the aforementioned correction value including the first value and the second value.

As illustrated in FIG. 6, the data processing unit 10D includes an analog-digital conversion circuit 101D, an activation function processing circuit 102D, and a digital-analog conversion circuit 103D. The analog-digital conversion circuit 101D converts an analog signal representing the sum of the output signals corrected by the correction unit 10H into a digital signal. The activation function processing circuit 102D performs activation function processing on this digital signal. The digital-analog conversion circuit 103D converts the digital signal on which activation function processing has been performed into an analog signal. This analog signal is output to another multiply-accumulate calculation device, for example.

The multiply-accumulate calculation device 1 separately generates the reference voltage for reading the voltage of the capacitor 101S and the correction voltage for correcting the sum of the output signals corrected by the correction unit 10H by using the accumulate calculation unit 10S, the correction unit 10H, and the data processing unit 10D illustrated in FIG. 6. Accordingly, the multiply-accumulate calculation device 1 can generate an accurate correction voltage and accurately correct the sum of the output signals output from the multiple calculation units 111, 211, . . . , k11.

Figure 7:
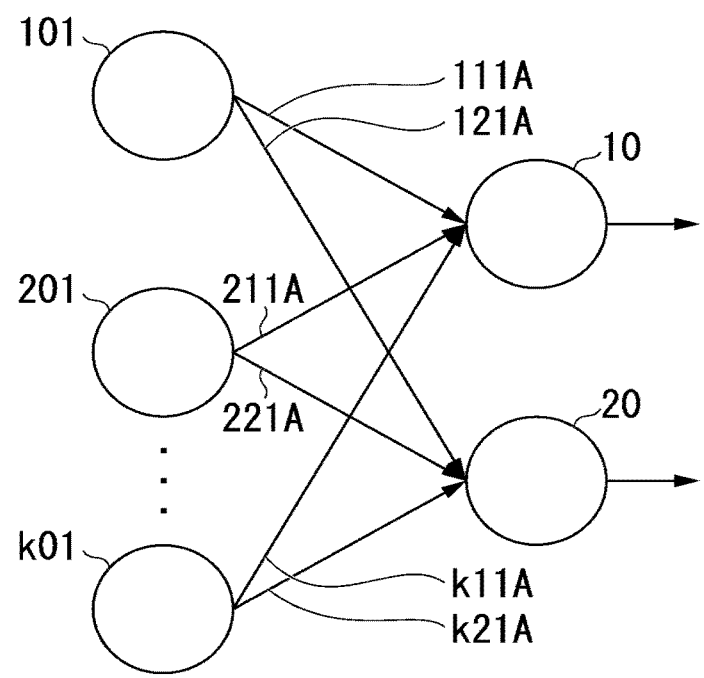
FIG. 7 is a diagram for describing an example of a neural network operation executed by the multiply-accumulate calculation device according to the first embodiment.

Next, an example of a neural network operation executed by the multiply-accumulate calculation device according to the first embodiment will be described with reference to FIG. 7. FIG. 7 is a diagram for describing an example of a neural network operation executed by the multiply-accumulate calculation device according to the first embodiment.

Nodes 101, 201, . . . , k01 form an input layer. Perceptrons 10 and 20 form a hidden layer or an output layer. The node 101 corresponds to the input unit 101E illustrated in FIG. 1 and FIG. 3 and outputs an input value corresponding to an input signal to the perceptrons 10 and 20. Likewise, the nodes 201, . . . , k01 respectively correspond to the input units 201E, . . . , k01E and output input values corresponding to input signals to the perceptrons 10 and 20.

An arrow 111A corresponds to the multiple calculation unit 111 and represents that the input value output from the node 101 is multiplied by a weight and a value corresponding to an output signal is input to the perceptron 10. Likewise, an arrow 121A corresponds to the multiple calculation unit 121 and represents that the input value output from the node 101 is multiplied by a weight and a value corresponding to an output signal is input to the perceptron 20. The same applies to arrows 211A, 221A, . . . , k11A, and k21A.

The perceptron 10 corresponds to the accumulate calculation unit 10S, the correction unit 10H, and the data processing unit 10D illustrated in FIG. 1 and FIG. 3, calculates the sum of input values represented by the arrows 111A, 211A, . . . , k11A, executes the above-described correction processing thereon, performs activation function processing on the sum on which the correction processing has been executed, and outputs the processed sum. Likewise, the perceptron 20 corresponds to the accumulate calculation unit 20S, the correction unit 20H, and the data processing unit 20D illustrated in FIG. 1 and FIG. 3, calculates the sum of input values represented by the arrows 121A, 221A, . . . , k21A, executes the above-described correction processing thereon, performs activation function processing on the sum on which the correction processing has been executed, and outputs the processed sum.

The multiply-accumulate calculation device 1 according to the first embodiment has been described above. The multiply-accumulate calculation device 1 corrects the sum of output signals on the basis of the correction value including at least one of the first value incorporated into the sum by a current flowing into the variable resistor of at least one of the multiple calculation units 111, 121, 211, 221, . . . , k11, and k21 due to the rising part of the input signal VC and the second value incorporated into the sum by a current flowing into the variable resistor of at least one of the multiple calculation units 111, 121, 211, 221, . . . , k11, and k21 due to the falling part of the input signal VC. Accordingly, the multiply-accumulate calculation device 1 can correct variation in the sum of the output signals due to at least one of the rising part and the falling part of the input signal VC and execute accurate multiple calculation.

In addition, at least one of the multiple calculation units 111, 121, 211, 221, ..., k11, and k21 includes a magnetoresistance effect element exhibiting the magnetoresistance effect. For the magnetoresistance effect element, it is particularly necessary to decrease voltage change rates at a rising part and a falling part of an input signal to alleviate heating of the circuit and a load of the circuit due to rush currents because the magnetoresistance effect element has larger parasitic capacitance than other variable resistance elements. Accordingly, in a case where at least one of the multiple calculation units 111, 121, 211, 221, ..., k11, and k21 includes a magnetoresistance effect element, the effect obtained by using the correction value including at least one of the first value and the second value is particularly useful.

The multiple calculation unit 111 includes the read terminal 111X, the common terminal 111Y, and the write terminal 111Z. Accordingly, the multiply-accumulate calculation device 1 is affected by the parasitic capacitor 111C only when it executes multiply-accumulate calculation and can change the resistance value of the variable resistor 111R without being affected by the parasitic capacitor 111C when a write current flows between the common terminal 111Y and the write terminal 111Z. In addition, the same applies to the multiple calculation units 121, 211, 221, ..., k11, and k21.

Furthermore, the multiply-accumulate calculation device 1 inputs the input signal VH for correction having a rising part and a falling part to the multiple calculation units 111, 121, 211, 221, ..., k11, and k21, multiplies the input signal VH for correction by a weight to generate output signals for correction, and executes correction processing using the sum of these output signals for correction as a correction value. Accordingly, the multiply-accumulate calculation device 1 can generate an accurate correction value and thus can execute accurate multiply-accumulate calculation.

In addition, the multiply-accumulate calculation device 1 inputs an input signal to the multiple calculation units 111, 121, 211, 221, ..., k11, and k21 through the resistors 101Q, 201Q, ..., k01Q, respectively. Accordingly, the multiply-accumulate calculation device 1 can execute accurate multiply-accumulate calculation by decreasing voltage change rates at a rising part and a falling part of the input signal VA even if the rising part and the falling part are steep and executing correction processing using a correction value including at least one of the first value and the second value.

Meanwhile, the multiply-accumulate calculation device 1 may include resistors respectively provided immediately before the read terminals 111X, 121X, 211X, 221X, ..., k11X, and k21X of the multiple calculation units instead of the resistors 101Q, 201Q, ..., k01Q. The function of these resistors is the same as that of the resistors 101Q, 201Q, ..., and k01Q.

Second Embodiment

An example of a configuration of a multiply-accumulate calculation device according to the second embodiment will be described with reference to FIG. 8. The multiply-accumulate calculation device according to the second embodiment differs from the multiply-accumulate calculation device 1 according to the first embodiment with respect to the specific configuration of the accumulate calculation unit 10S, the correction unit 10H, and the data processing unit 10D described with reference to FIG. 6. Accordingly, only differences from the first embodiment are described and redundant description is omitted in description of the second embodiment.

Figure 8:
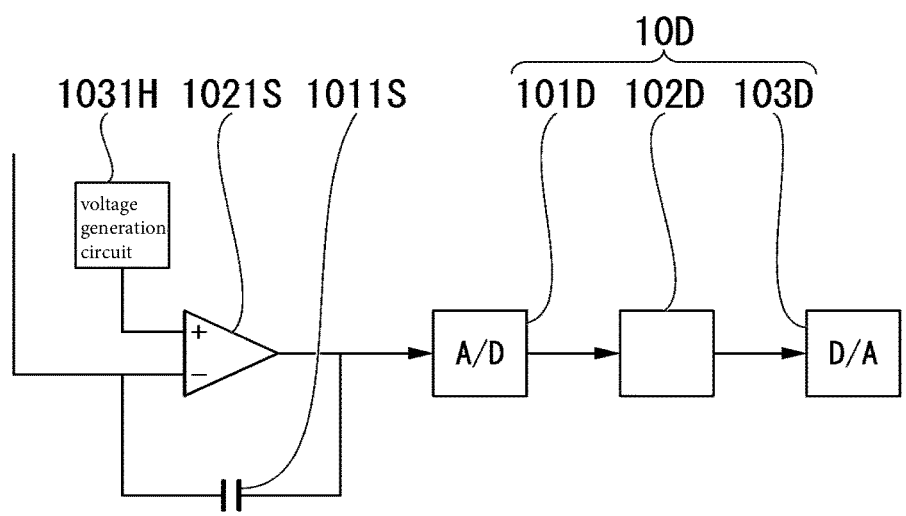
FIG. 8 is a diagram for describing an example of an accumulate calculation unit, a correction unit, and a data processing unit according to a second embodiment.

FIG. 8 is a diagram for describing an example of an accumulate calculation unit, a correction unit, and a data processing unit according to the second embodiment. As illustrated in FIG. 8, the multiply-accumulate calculation device according to the second embodiment includes a capacitor 1011S, a comparator 1021S, a voltage generation circuit 1031H, and the data processing unit 10D. The data processing unit 10D is the same as that of the first embodiment.

One terminal of the capacitor 1011S is connected to the common terminals 111Y, 211Y, ..., k11Y of the multiple calculation units 111, 211, ..., k11 and an inverted input terminal of the comparator 1021S and the other terminal thereof is connected to an output terminal of the comparator 1021S. Charges caused by output signals output from the multiple calculation units 111, 211, ..., k11 are accumulated in the capacitor 1011S. The comparator 1021S reads the voltage of the capacitor 1011S using a reference voltage and a correction voltage supplied from the voltage generation circuit 1031H connected to a non-inverted input terminal thereof. Here, the comparator 1021S reads a voltage on which correction processing using a correction value has been performed because the correction voltage as well as the reference voltage is supplied to the comparator 1021S.

Accordingly, the multiply-accumulate calculation device according to the second embodiment can reduce the circuit scale by integrating a comparator used to calculate the sum of output signals and a comparator used to correct the sum.

Third Embodiment

An example of a configuration of a multiply-accumulate calculation device according to the third embodiment will be described with reference to FIG. 9. The multiply-accumulate calculation device according to the third embodiment executes correction processing using a digital circuit differently from the multiply-accumulate calculation device 1 according to the first embodiment and the multiply-accumulate calculation device according to the second embodiment which execute correction processing using an analog circuit. Accordingly, only differences from the first embodiment and the second embodiment are described and redundant description is omitted in description of the third embodiment.

Figure 9:
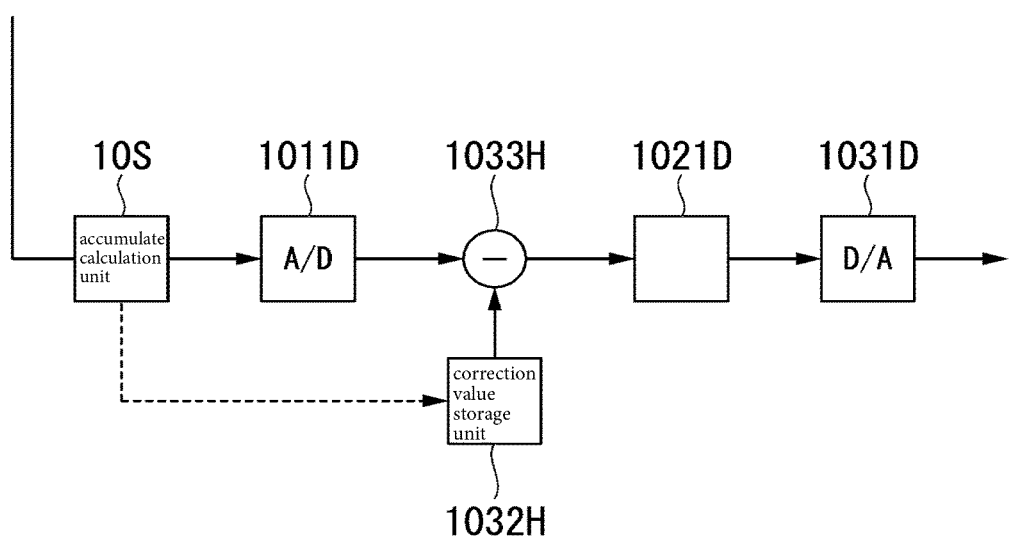
FIG. 9 is a diagram for describing an example of an accumulate calculation unit, a correction unit, and a data processing unit according to a third embodiment.

FIG. 9 is a diagram for describing an example of an accumulate calculation unit, a correction unit, and a data processing unit according to the third embodiment. As illustrated in FIG. 9, the multiply-accumulate calculation device according to the third embodiment includes an accumulate calculation unit 10S, an analog-digital conversion circuit 1011D, a correction value storage unit 1032H, an operation circuit 1033H, an activation function processing circuit 1021D, and a digital-analog conversion circuit 1031D. The accumulate calculation unit 10S is the same as that of the first embodiment.

The analog-digital conversion circuit 1011D converts an analog signal representing the sum of output signals output from the accumulate calculation unit 10S into a digital signal. The correction value storage unit 1032H is a storage medium storing correction values as digital data. The operation circuit 1033H acquires a correction value from the correction value storage unit 1032H, subtracts the correction value from the sum of output signals converted into the digital signal, and outputs the resultant digital signal. The activation function processing circuit 1021D performs activation function processing on this digital signal. The digital-analog conversion circuit 1031D converts the digital signal on which activation function processing has been performed into an analog signal.

Accordingly, the multiply-accumulate calculation device according to the third embodiment can execute the above-described correction processing only by adding the correction value storage unit 1032H and the operation circuit 1033H to the multiply-accumulate calculation device as an already used analog circuit. In addition, the multiply-accumulate calculation device according to the third embodiment causes correction values to be stored in the correction value storage unit 1032H and thus need not calculate a correction value whenever the above-described correction processing is executed. Further, the multiply-accumulate calculation device according to the third embodiment can execute correction processing based on a correction value while curbing increase in the circuit scale of a correction unit by including the correction value storage unit 1032H outside the correction unit. In addition, since the number of correction units is less than the number of multiple calculation units, the multiply-accumulate calculation device according to the third embodiment need not increase the storage capacity of the correction value storage unit 1032H.

Meanwhile, the above-described multiply-accumulate calculation device 1 may be included in a logical calculation device or a neuromorphic device. The logical calculation device mentioned here is a logic circuit formed by combining a plurality of multiply-accumulate calculation devices 1, for example, an AND circuit or an OR circuit. In addition, a logical calculation mentioned here is a concept including deep learning. Furthermore, the neuromorphic device mentioned here is a device using the brain structure and a firing system of nerve cells called neurons and is used for machine learning and the like.

In addition, processing may be performed by recording a program for realizing the function of each device such as the multiply-accumulate calculation device 1 according to the above-described first embodiment in a computer-readable recording medium and causing a computer system to read and execute the program recorded in this recording medium.

The computer system mentioned here may include an operating system (OS) or hardware such as peripheral devices. In addition, the computer-readable recording medium may also include, for example, writable nonvolatile memories such as a floppy disk, a magneto-optical disk, a read only memory (ROM) and a flash memory, a portable medium such as a digital versatile disc (DVD), a storage device such as a hard disk embedded in a computer system, and a recording medium that holds a program for a specific time, such as a volatile memory in a computer system serving as a server or a client in a case where the program is transmitted through a network or a communication circuit.

In addition, the aforementioned program may be transmitted from a computer system in which this program is stored in a storage device or the like to another computer system through a transmission medium or according to transmitted waves in the transmission medium. Here, the transmission medium that carries the program refers to a medium having a function of transmitting information, such as a network such as the Internet or a communication circuit such as a telephone circuit.

Furthermore, the aforementioned program may be a program for realizing some of the above-described functions or a program which can realize the above-described functions according to a combination with a program already recorded in a computer system, that is, a so-called a difference program. The aforementioned program may be read and executed by a processor such as a central processing unit (CPU) included in a computer, for example.

Although the embodiments of the present disclosure have been described in detail with reference to the drawings, a specific configuration is not limited to the first embodiment and various modifications and substitutions can be made without departing from essential characteristics of the present disclosure. The configurations described in the above-described first embodiment may be combined.

REFERENCE SIGNS LIST

1 Multiply-accumulate calculation device
111, 121, 211, 221, k11, k21 Multiple calculation unit
111R, 121R, 211R, 221R, k11R, k21R Variable resistor
10S, 20S Accumulate calculation unit
10H, 20H Correction unit

The invention claimed is:

1. A multiply-accumulate calculation device comprising:
a plurality of multiple calculation units configured to generate output signals by multiplying an input signal corresponding to an input value and having a rising part, a signal part, and a falling part by a weight, and output the output signals;
an accumulate calculation unit configured to calculate a sum of the output signals output from the plurality of multiple calculation units; and
a correction unit configured to execute correction processing for correcting the sum of the output signals on the basis of a correction value including at least one of a first value incorporated into the sum by a current flowing into variable resistors of the plurality of multiple calculation units due to the rising part of the input signal, and a second value incorporated into the sum by a current flowing into the variable resistors of the plurality of multiple calculation units due to the falling part of the input signal.

2. The multiply-accumulate calculation device according to claim 1, wherein each of the plurality of multiple calculation units includes a magnetoresistance effect element representing a magnetoresistance effect.

3. The multiply-accumulate calculation device according to claim 1, wherein each of the plurality of multiple calculation units includes a resistance change element having a write terminal, a common terminal, and a read terminal.

4. The multiply-accumulate calculation device according to claim 1, further comprising an input circuit configured to input an input signal for correction having the rising part and the falling part to the multiple calculation units,
wherein the multiple calculation units is further configured to generate output signals for correction by multiplying the input signal for correction by a weight, and output the output signals for correction,
the accumulate calculation unit is further configured to calculate a sum of the output signals for correction output from the plurality of multiple calculation units, and
the correction unit is configured to execute the correction processing using the sum of the output signals for correction as the correction value.

5. The multiply-accumulate calculation device according to claim 1, further comprising a correction value storage unit configured to store the correction value.

6. The multiply-accumulate calculation device according to claim 1, wherein the input signal is input to the multiple calculation units through resistors.

7. The multiply-accumulate calculation device according to claim 2, further comprising a correction value storage unit configured to store the correction value.

8. The multiply-accumulate calculation device according to claim 3, further comprising a correction value storage unit configured to store the correction value.

9. The multiply-accumulate calculation device according to claim 4, further comprising a correction value storage unit configured to store the correction value.

10. The multiply-accumulate calculation device according to claim 2, wherein the input signal is input to the multiple calculation units through resistors.

11. The multiply-accumulate calculation device according to claim 3, wherein the input signal is input to the multiple calculation units through resistors.

12. The multiply-accumulate calculation device according to claim 4, wherein the input signal is input to the multiple calculation units through resistors.

13. The multiply-accumulate calculation device according to claim 5, wherein the input signal is input to the multiple calculation units through resistors.

14. A multiply-accumulate calculation method comprising:

generating, by a plurality of multiple calculation units, output signals by multiplying an input signal corresponding to an input value and having a signal part, a rising part, and a falling part by a weight, and outputting the output signals;

calculating, by an accumulate calculation unit, a sum of the output signals output by the plurality of multiple calculation units; and executing, by a correction unit, correction processing for correcting the sum of the output signals on the basis of a correction value including at least one of a first value incorporated into the sum by a current flowing into variable resistors of the plurality of multiple calculation units due to the rising part of the input signal, and a second value incorporated into the sum by a current flowing into the variable resistors of the plurality of multiple calculation units due to the falling part of the input signal.

* * * * *